US009959335B2

(12) United States Patent
Cho et al.

(10) Patent No.: US 9,959,335 B2
(45) Date of Patent: May 1, 2018

(54) SYSTEM AND METHOD FOR AVOIDING OBJECT IDENTIFIER COLLISIONS IN A PEERED CLUSTER ENVIRONMENT

(71) Applicant: NetApp, Inc., Sunnyvale, CA (US)

(72) Inventors: Yong Eun Cho, Saratoga, CA (US); Anuja Jaiswal, San Jose, CA (US); Vani Vully, Bangalore (IN); Andrew Dunn, Sunnyvale, CA (US); Chaitanya Patel, Morrisville, NC (US); Susan M. Coatney, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 461 days.

(21) Appl. No.: 14/560,297

(22) Filed: Dec. 4, 2014

(65) Prior Publication Data

US 2016/0085842 A1 Mar. 24, 2016

(30) Foreign Application Priority Data

Sep. 22, 2014 (IN) .......................... 2710/DEL/2014

(51) Int. Cl.
*G06F 17/30* (2006.01)
*G06F 3/06* (2006.01)

(52) U.S. Cl.
CPC ........ *G06F 17/30598* (2013.01); *G06F 3/067* (2013.01); *G06F 3/0614* (2013.01); *G06F 3/0631* (2013.01); *G06F 17/30312* (2013.01)

(58) Field of Classification Search
CPC ............. G06F 17/30598; G06F 3/0614; G06F 3/0631; G06F 3/067; G06F 17/30312
See application file for complete search history.

(56) References Cited

U.S. PATENT DOCUMENTS

| 6,934,710 | B1* | 8/2005 | Mills ................. G06F 17/30575 |
| 7,590,672 | B2* | 9/2009 | Slik ....................... G06F 3/0605 |
| 8,489,811 | B1 | 7/2013 | Corbett et al. |
| 8,904,141 | B2* | 12/2014 | Jess ....................... G06F 17/303 |
| | | | 711/170 |
| 9,111,116 | B2* | 8/2015 | Mattsson ............. G06F 21/6245 |
| 9,405,783 | B2* | 8/2016 | Kimmel ............... G06F 17/3033 |
| 2005/0172005 | A1 | 8/2005 | Goodwin |
| 2012/0259912 | A1* | 10/2012 | Kruse ................. G06F 17/3012 |
| | | | 709/203 |
| 2013/0339567 | A1* | 12/2013 | Carpentier .......... G06F 11/0709 |
| | | | 711/4 |
| 2014/0189082 | A1* | 7/2014 | Fullarton ............ H04L 12/2402 |
| | | | 709/223 |
| 2015/0096038 | A1* | 4/2015 | Mattsson ............ G06F 21/6245 |
| | | | 726/26 |
| 2015/0301948 | A1* | 10/2015 | Carpentier .......... G06F 11/0709 |
| | | | 711/202 |

OTHER PUBLICATIONS

Int. Search Report/Written Opinion cited in PCT Application No. PCT/US2015/051148 dated Dec. 23, 2015, 11 pgs.

* cited by examiner

*Primary Examiner* — Jeff A Burke
(74) *Attorney, Agent, or Firm* — Cooper Legal Group, LLC

(57) ABSTRACT

A system and method for avoiding object identifier collisions in a cluster environment is provided. Upon creation of the cluster, volume location databases negotiate ranges for data set identifiers (DSIDs) between a first site and a second site of the cluster. Any pre-existing objects are remapped into an object identifier range associated with the particular site hosting the object.

20 Claims, 12 Drawing Sheets

1100

| LAST ALLOCATED DSID | 1105 |
| --- | --- |
| LAST ALLOCATED MSID | 1110 |
| LAST ALLOCATED REFERENCE ID | 1115 |
| LAST ALLOCATED DSID FOR PARTNER | 1120 |
| ⋮ | 1125 |

| OLD DSID | 1205 |
|---|---|
| NEW DSID | 1210 |
| ⋮ | 1215 |

FIG. 12

SYSTEM AND METHOD FOR AVOIDING OBJECT IDENTIFIER COLLISIONS IN A PEERED CLUSTER ENVIRONMENT

RELATED APPLICATION

The present application claims priority to Indian patent application entitled SYSTEM AND METHOD FOR AVOIDING OBJECT IDENTIFIER COLLISIONS IN A PEERED CLUSTER ENVIRONMENT the application of which was filed by Cho et al. on Sep. 22, 2014 and accorded Indian Application No. 2710/DEL/2014.

BACKGROUND

Technical Field

The present disclosure relates to clustered storage systems and, more specifically, to maintaining unique object identifiers in a clustered storage system Background Information A storage system typically includes one or more storage devices, such as disks, into which information (i.e. data) may be entered, and from which data may be obtained, as desired. The storage system (i.e., node) may logically organize the data stored on the devices as storage containers, such as files, logical units (luns), and/or aggregates having one or more volumes that hold files and/or luns. To improve the performance and availability of the data contained in the storage containers, a plurality of nodes may be interconnected as a cluster configured to provide storage service relating to the organization of the storage containers and with the property that when one node fails another node may service data access requests, i.e., operations, directed to the failed node's storage containers.

A data set identifier (DSID) is utilized as a cluster wide identifier for volumes. Illustratively, each DSID is associated with a particular instantiation of a volume, e.g., mirrors, etc. In the event of cluster to cluster communication referencing a volume (or other data object), it is possible that a volume from a first cluster and a volume from a second cluster may have been assigned identical DSIDs. This collision between two different volumes having identical DSIDs may result in error conditions during inter-cluster operations.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 11 is a block diagram of a tracking data structure;

FIG. 12 is a data set identifier mapping data structure; and

DESCRIPTION OF ILLUSTRATIVE EMBODIMENTS

The embodiments described herein provide a system and method for avoiding object identifier collisions in a cluster environment by enabling volume location databases (VLDBs) associated with clusters pairs to negotiate a range of object identifiers that each will utilize during operation. In an embodiment, when a command is executed initialize a disaster recover group between two clusters, the first VLDB transmits a message to the second VLDB indicating that a clustering arrangement has been initiated. In response, the second VLDB selects a range of object identifiers, such as data set identifiers (DSIDs), that will be associated with objects on the second VLDB. The VLDB stores the selected range within a table and also identifies whether any currently existing data objects associated with the VLDB are conflicting with the selected range. Should any be conflicting with the selected range, the second VLDB creates a new mapping between the current object identifier and a new object identifier that is within the selected range. The second VLDB then returns a message to the first VLDB. In response, the first VLDB selects the remaining range of object identifiers and stores that information within a table. Further, the first VLDB identifies whether any existing data objects associated with the first VLDB conflict with the range of object identifiers associated with the first VLDB. Should there be any conflicts, the first VLDB re-maps those conflicting object identifiers to an object identifier within the appropriate range. The two VLDBs then commit various tables to their replicated databases and the cluster creation process continues.

Disaster Recovery Group

Figure 1:
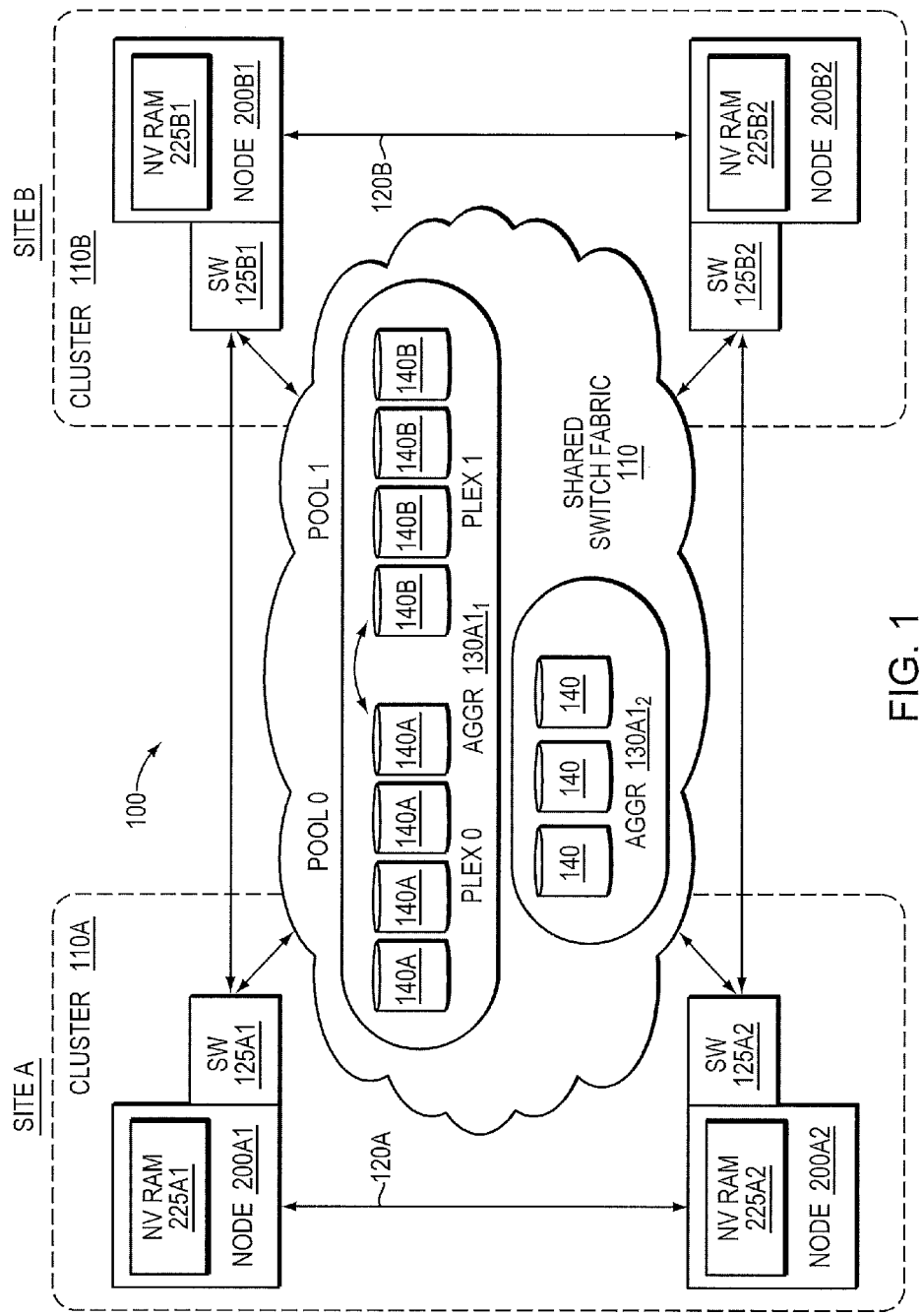
FIG. 1 is a block diagram of a high availability cluster arrangement.

FIG. 1 is a block diagram of a disaster recover (DR) group 100 comprising of nodes 200 disposed at multiple sites, e.g., site A and site B. The various sites, e.g., A and B, may be physically remote from each other. In an embodiment, the sites are located in separate buildings that are geographically dispersed so that in the event of a catastrophic incident, both sites are not damaged simultaneously. The nodes 200 at each site (e.g., Site A, Site B) may arranged as a cluster 110 composed of a high availability (HA) pair (e.g., a local node and HA partner node) interconnected by an HA interconnect 120. Such HA partner arrangement may provide redundancy within the site that if one node should fail, the other node may assume its role by performing a takeover (TO) operation. Similarly, nodes within a site may be paired with nodes of another site to create (DR) pairs (e.g., a local node and DR partner node interconnected via switches 125 (e.g., Fibre Channel (FC) switches). Such DR partner arrangement may provide redundancy across sites, such that if the site within which a node resides should fail, a node at the other may assume its role by performing a switchover (SO) operation (i.e., a cross-cluster takeover).

Whether a node is a local node, a HA partner node, a DR partner node, or an DR auxiliary node (i.e., the HA partner node of a DR partner node) depends on the perspective one looks at the system. For example, from the perspective of node 200A1, node 201A1 is the local node, node 200A2 is the HA partner node, node 200B1 is the DR partner node, and node 200B2 is the DR auxiliary node. Likewise, from the perspective of node 200B1, node 200B1 is the local node, node 200B2 is the HA partner node, node 200A1 is the DR partner node, and node 200A2 is the DR auxiliary node. While much of the description below, is from the perspective of node 200A1 (such that node 200A1 is the local node), in some cases perspectives from other nodes, such as node 200B1, are utilized for illustrative purposes. It should be understood that the choice of perspective, and thus the roles of certain nodes, is simply for clarity of illustration, and that specific nodes are not limited to specific roles, but instead may simultaneous fulfill multiple roles.

Each node 200 is coupled to a shared storage fabric 110 via a switch 125, e.g. via the node's related switch 125, including a plurality of storage devices (e.g., disks) upon which data may be stored. Clients (not shown) may access data stored in the shared storage fabric 110 by interacting with the nodes 200 in accordance with a client/server model of information delivery. In response to requests (e.g., data access requests) from the clients the nodes 200 may perform operations (e.g., service data access requests) directed to storage devices of the shared storage fabric, and logical storage containers organized thereon.

The storage devices within the storage fabric may be physically divided into pools (e.g., Pool 0, Pool 1) which may are located at different sites (e.g., Site A, Site B). For example, storage devices physically located at Site A may be organized into a Pool 0, and storage devices physically located at Site B may be organized into a Pool 1. Storage devices of a pool may be physically located on one or more disk shelves. In a given pool, disks are illustratively organized as one or more Redundant Array of Independent (or Inexpensive) Disks (RAID) groups. The RAID groups may be implemented at a RAID level, such as RAID-4 where reliability/integrity of data storage is increased by redundant writing of data "stripes" across a given number of storage devices in the RAID group, and parity information with respect to the striped data being stored on dedicated storage device. Likewise, a RAID group may be implemented using another type of RAID implementation, such as RAID double-parity (RAID-DP) which implements double parity stripes within a RAID-6 type layout. It should be should be understood that a wide variety of other levels and types of RAID may alternatively be utilized.

One or more RAID groups may be organized into aggregates (AGGRs) that represent a collection of storage. The aggregates may include a root aggregate that contains a root volume storing special directories and configuration files, as well as data aggregates which store user data. While each aggregate may be physically accessible to multiple nodes 200, each aggregate is generally "owned" by a single node which is arranged to perform operations (e.g., service data access requests) directed to that aggregate. Further, in order to provide greater redundancy than already provided via RAID parity, each aggregate may be mirrored to create mirrored aggregates such that the RAID groups in the aggregate are themselves mirrored between two groups of storage devices referred to as "plexes", dispersed in different pools (e.g., Pool 0, Pool 1). For example, an aggregate 130A1$_1$ may include a Plex 0 upon storage devices of Pool 0 and Plex 1 that utilizes storage devices in Pool 1. The RAID groups in Plex 0 may have identical counterparts in Plex 1. Such mirroring may be performed using RAID-level mirroring techniques which ensure a high level of data consistence.

To facilitate access to data stored in the shared storage fabric 110, the nodes 200 may further "virtualize" the storage space. For example, a file system, e.g. a Write Anywhere File Layout (WAFL®) file system, may logically organize the data stored on into a hierarchical structure of named storage containers, such as directories and files. Each file may be implemented as set of disk blocks configured to store data, whereas the directory may be implemented as a specially formatted file in which names and links to other files and directories are stored. Further, information may organized into a hierarchical structure of storage containers, such as blocks, that are exported as named logical unit numbers (luns). The nodes 200 may service requests based on file-based access protocols, such as the Common Internet File System (CIFS) protocol or Network File System (NFS) protocol, to permit access to certain storage containers, such as files and directories. Likewise, the nodes 200 may service requests based on block-based access protocols, such as the Small Computer Systems Interface (SCSI) protocol encapsulated over TCP (iSCSI) and SCSI encapsulated over Fibre Channel (FCP), to permit access to form of other types storage containers, such as blocks or luns.

Each node 200 may log ongoing operation (e.g. data access requests) directed to the storage devices of the aggregates 130 owned by the node. Illustratively, such logged operations may include operations have been received and acted upon (processed) not yet been committed (i.e., persistently stored) to the storage devices. This information is illustratively maintained in a non-volatile random access memory (NVRAM) 225 of the node 200, or more specifically a local portion of the NVRAM 225 of the node 200. During normal operation data in the NVRAM (e.g., 225A1) of a local node (e.g., node 200A1) is mirrored to the NVRAM (e.g., 225A2) of the HA partner node (e.g., node 200A2) and maintained in the NVRAM of the HA partner node. As part of a takeover sequence performed by the HA partner node (e.g., 200A2) in response to a failure of the local node (e.g., node 200A1), the HA partner node may assumes the identity of the failed node, accesses the storage devices utilized by the failed node, replay the mirrored operations maintained in its NVRAM (e.g., 225A2).

Similarly, during normal operation data in the NVRAM (e.g., 225A1) of a local node (e.g., node 200A1) is mirrored to the NVRAM (e.g., 225B1) of the DR partner node (e.g., node 200B1) and maintained in the NVRAM of the DR partner node. As part of a switchover sequence performed by the DR partner node (e.g., 200B1) in response to a failure of the site (e.g., Site A) of the local node (e.g., node 200A1), the DR partner node may assumes the identity of the failed node and replay the mirrored operations maintained in its NVRAM (e.g., 225B1). Since the storage devices, and plexes thereof (e.g., Plex 0) physical located at the failed site (e.g., Site A), may be no longer operable, the switchover may utilize the plexes (e.g., Plex 1) at the other site (e.g., Site B), in the case of mirrored aggregates (e.g., aggregate 140A1$_1$).

Since the DR partner node (e.g., 200B1) itself has an HA partner node (e.g., auxiliary node 200B2), it should be understood that data in the NVRAM (e.g., 225A1) of a local node (e.g., node 200A1) mirrored to the DR partner node (e.g., 200A2) may further be mirrored to the auxiliary node (e.g., node 200B2), thereby allowing that node to also be able to take over for the node, in case of multiple failures.

Node

Figure 2:
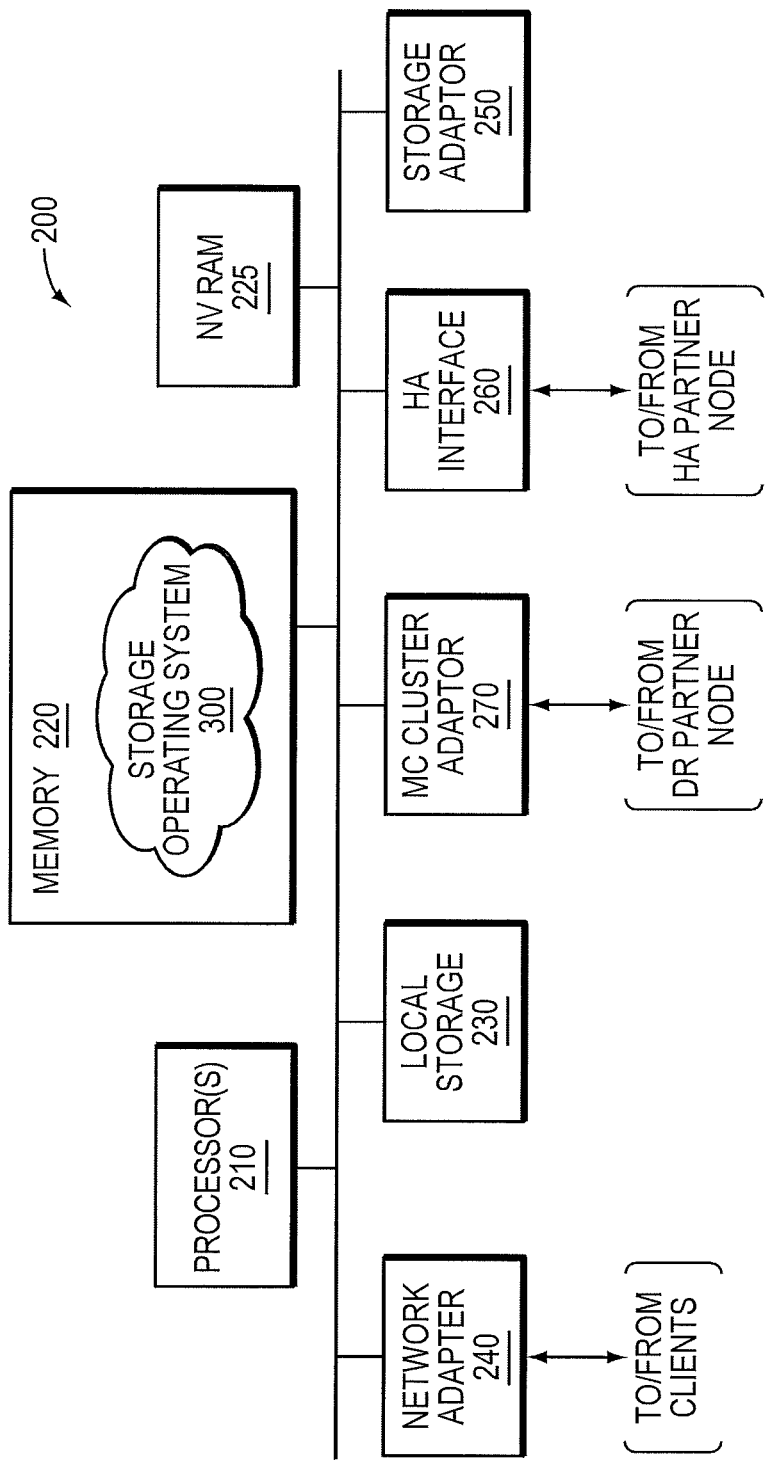
FIG. 2 is a block diagram of a node.

FIG. 2 is a block diagram of a node 200 that that may be utilized in the disaster DR group 100 of FIG. 1 (e.g., as node 200A1, 200A2, 200B1 or 200B2). The node 200 includes one or more processors 210, a memory 220, local storage 230, a network adapter 270, a virtual interface (VI) adapter 240, an HA interface 250, a storage adapter 260, a cluster adapter 270 and a NVRAM 225 interconnected by a system interconnect 225, such as bus.

The processor(s) 210 and in some implementations, the adapters/interfaces 240-270 may include processing elements and/or logic circuitry configured to execute software programs and manipulate the data structures. In some cases, the processing elements of the adapters/interfaces 240-270 may be configured to offload some or all of the packet processing and storage access operations, respectively, from the processor(s) 210 to thereby increase the performance of the storage service provided by the node 200.

The memory 220 may include memory locations for storing at least some of the software programs and manipulate the data structures. Among these programs may be a storage operating system 300 that functionally organizes the node 200 by, among other things invoking operations in support of the storage service implemented by the node. In an embodiment, the storage operating system is the NetApp® Data ONTAP™ operating system available from NetApp, Inc., Sunnyvale, Calif. that implements a WAFL® file system. However, a variety of other types of storage operating systems that implement other types of file systems may alternatively be utilized.

The local storage 230 may include one or more local storage devices, such as solid state drives illustratively embodied as flash storage devices, utilized by the node to persistently store configuration information provided by one or more processes that execute on the node 200. The network adapter 240 may include one or more ports adapted to couple the node 200 to the clients over a network, which may, for example, take the form of an Ethernet network or a FC network. As such, the network adapter 240 may include a network interface controller (NIC) that may include a TCP/IP offload engine (TOE) and/or an iSCSI host bus adapter (HBA). Likewise, the storage adapter 250 may include one or more ports adapted to couple the node 200, via a switch (e.g., FC switch) 120, to storage devices of the shared storage fabric 110. The storage adapter 250 cooperates with the storage operating system 300 executing on the node 200 to service operations (e.g. data access requests) directed to the storage devices of the shared storage fabric 110. In one implementation, the storage adapter takes the form of a FC host bus adapter (HBA).

As discussed above, NVRAM 225 may log information such as ongoing operations (e.g. data access requests) serviced by the node 200, including operations have not yet been committed (i.e., persistently stored) to the storage devices. Such information may be maintained in a local portion of the NVRAM 225. Further, to permit takeover and switchover operations, the NVRAM may also store mirrored copies of information, such as logged operations serviced by the other nodes of the DR group (e.g., the nodes HA partner node, DR partner node, and Auxiliary node). Such information may be maintained in respective other portions of the NVRAM 225. In order to persistently store the logged information, the NVRAM 225 may include a back-up battery or be designed to intrinsically have last-state retention capability (e.g., include non-volatile semiconductor memory such as storage class memory) that allows the NVRAM to maintain information through system restarts, power failures, and the like.

A HA interface 260 may include port circuitry adapted to couple the node 200 to an HA partner node of a cluster via the HA interconnect 120. The HA interface 260 may be utilized to mirror (copy) the information, such as the operations (e.g. data access requests), maintained in the NVRAM of the node 200 to the NVRAM of its HA partner node, for example, utilizing remote direct memory access (RDMA) protocol. The operations may be processed by the file system of the node 200 and logged in the NVRAM 225 on a per-operation (e.g., per request basis).

Further, a metro cluster (MC) virtual interface (VI) adapter 270 may include port circuitry adapted to couple the node 200 to an a DR partner node, via switches (e.g., FC switches) 125. In one implementation, the MC VI adapter 270 may be a FC VI adapter. Similar to the HA interface, the MC VI adapter may be utilized to mirror (copy) information, such as the operations (e.g. data access requests), maintained in the NVRAM of the node 200 to the NVRAM of its DR partner node. The MC VI adapter 270 may copy ("mirror") the operations from the NVRAM of the node 200 to an NVRAM the DR partner node on a per-operation (e.g., per request basis).

Storage Operating System

To facilitate access to the disks 140, the storage operating system 300 implements a write-anywhere file system that cooperates with one or more virtualization modules to "virtualize" the storage space provided by disks 140. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
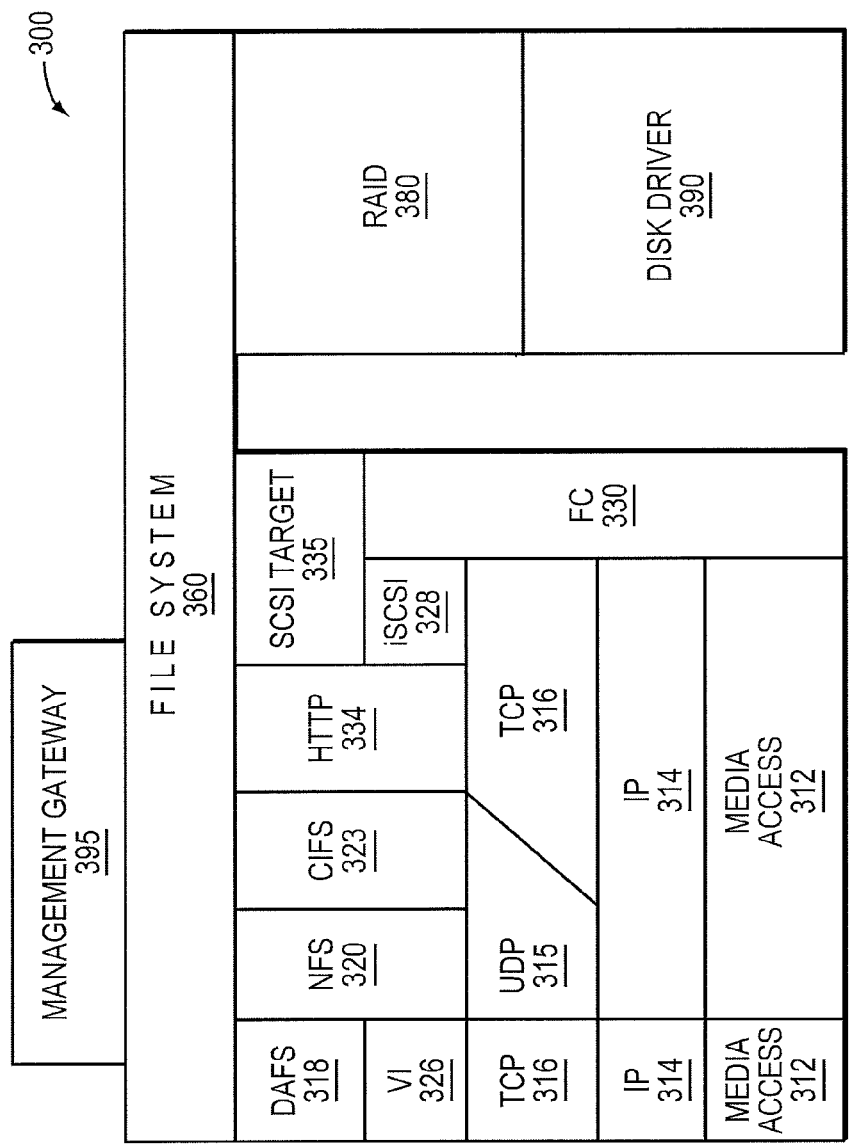
FIG. 3 is a block diagram of a storage operating system.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 323 and the Hypertext Transfer Protocol (HTTP) protocol 334. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server that provides data paths for accessing information stored on the disks 140 of the node 200. To that end, the storage server includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 810 (see FIG. 8), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system 360 uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

A management gateway 395 illustratively executes in user space of the storage operating system 300. Illustratively, the management gateway 395 manages communication from the storage operating system (or associated entities) such as the VLDB, described further below in reference to FIG. 8, and its counterpart at another site of the DR group. That is, for example, if an entity, such as VLDB at a first site desires to communicate with an entity, such as the VLDB at a second site, messages are passed between the respective management gateways 395 located on the two sites. That is, the communication path may be from VLDB A to the management gateway executing at site a to the management Gateway executing on site B and finally to the VLDB. It should be noted that while the management gateway 395 is shown executing in user space within storage operating system 300, it is expressly contemplated that in accordance with alternative embodiments of the present invention, the management gateway 395 may execute in kernel space or may be located elsewhere within the storage operating system. As such, the description of management gateway 395 and its depiction within the storage operating system should be taken as exemplary only. The management gateway is logically located in connection with VLDB 830, see below in relation to FIG. 8.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

The in-core and on-disk format structures of the WAFL file system, including the inodes and inode file, are disclosed and described in U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

File System Layout

Figure 4:
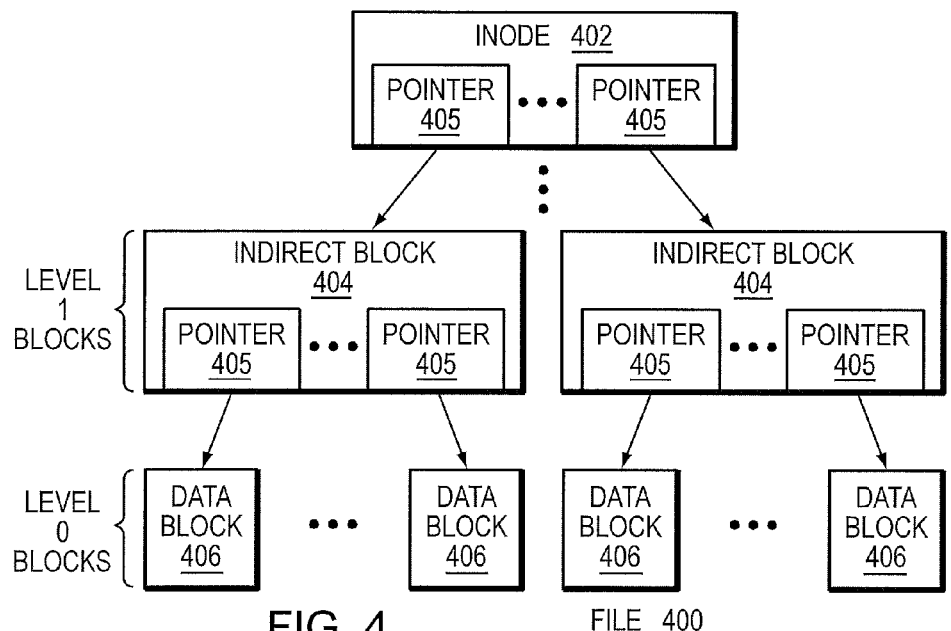
FIG. 4 is a schematic block diagram of an illustrative embodiment of a buffer tree of a file that may be advantageously used with the present invention.

FIG. 4 is a schematic block diagram of an embodiment of a buffer tree of a file that may be advantageously used with the present invention. The buffer tree is an internal representation of blocks for a file (e.g., file 400) loaded into the memory 220 and maintained by the write-anywhere file system 360. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on disks.

A file system layout is provided that apportions an underlying physical volume into one or more virtual volumes (or flexible volume) of a storage system, such as node 200. An example of such a file system layout is described in U.S. patent application Ser. No. 10/836,817 titled Extension of Write Anywhere File System Layout, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 400) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 5:
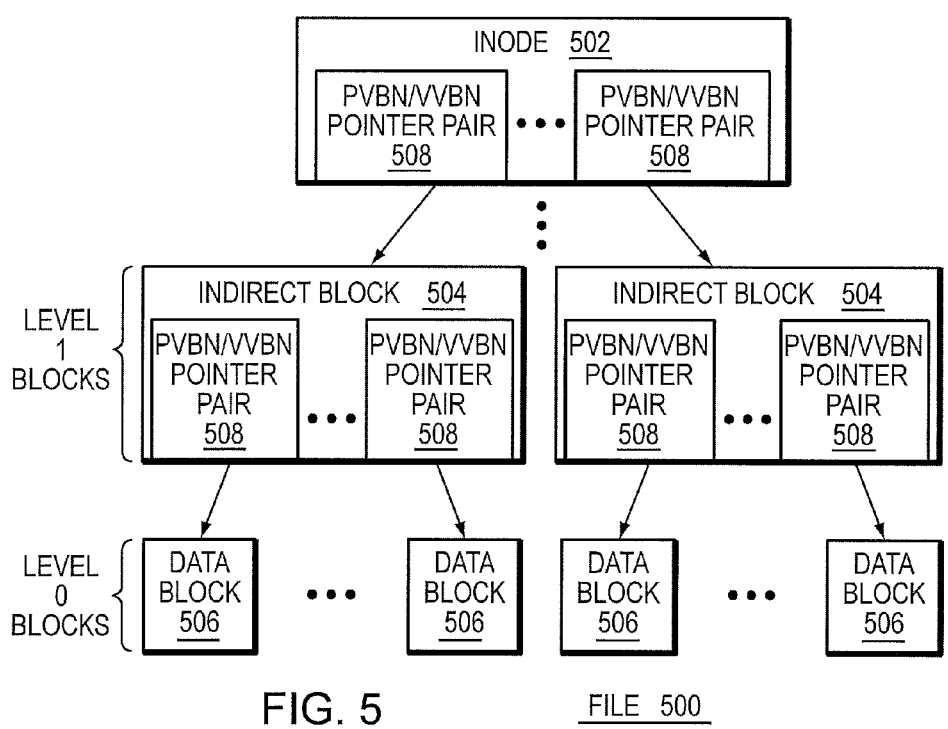
FIG. 5 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, Mode file level 0 (L0) blocks. FIG. 5 is a schematic block diagram of an illustrative embodiment of a buffer tree of a file 500 that may be advantageously used with the present invention. A root (top-level) Mode 502, such as an embedded Mode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 508 that ultimately reference data blocks 506 used to store the actual data of the file.

The pvbns reference locations on disks of the aggregate, whereas the vvbns reference locations within files of the flexible volume. The use of pvbns as block pointers 508 in the indirect blocks 504 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 6:
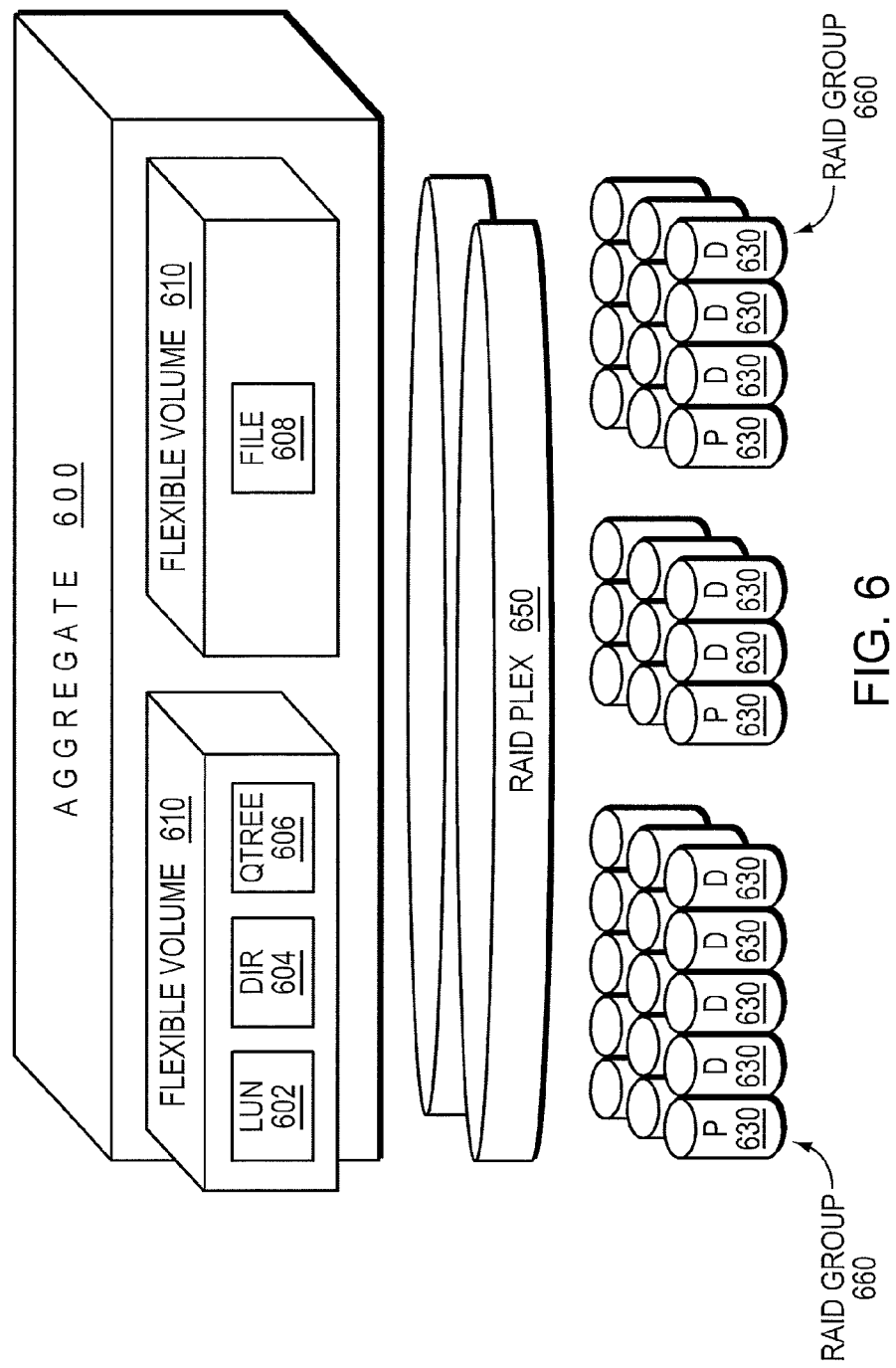
FIG. 6 is a schematic block diagram of an exemplary aggregate in accordance with an embodiment of the present invention.

FIG. 6 is a schematic block diagram of an embodiment of an aggregate 600 that may be advantageously used with the present invention. Luns (blocks) 602, directories 604, qtrees 606 and files 608 may be contained within flexible volumes 610, such as dual vbn flexible volumes, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a flexible volume is analogous to a file within that physical volume. That is, the aggregate 600 may include one or more files, wherein each file contains a flexible volume 610 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 610 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 7:
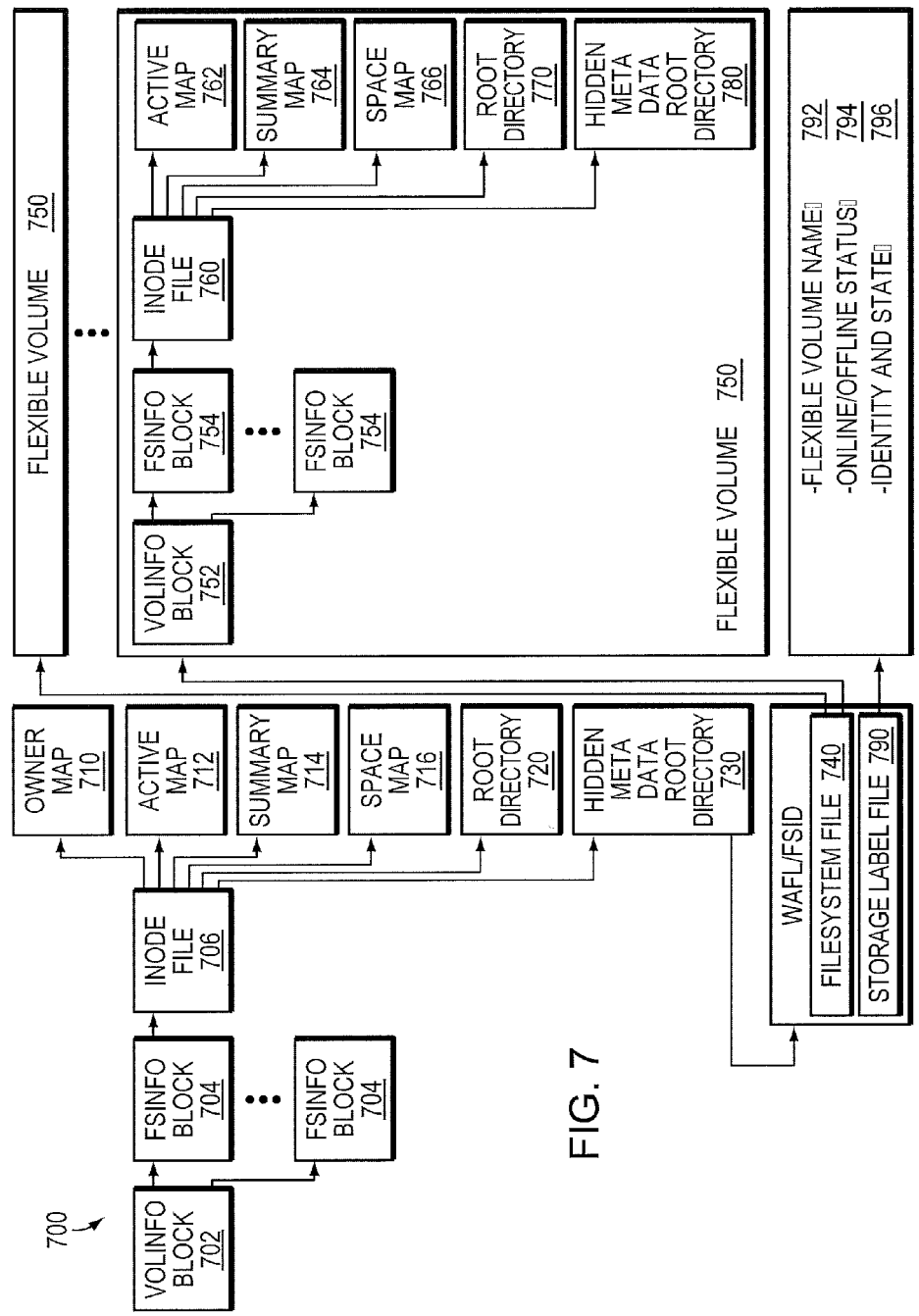
FIG. 7 is a schematic block diagram of an exemplary on-disk layout of the aggregate in accordance with an embodiment of the present invention.

FIG. 7 is a schematic block diagram of an on-disk representation of an aggregate 700. The storage operating system 300, e.g., the RAID system 380, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714 and a space map 716, as well as other special meta-data files. The inode file 706 further includes a root directory 720 and a "hidden" meta-data root directory 730, the latter of which includes a namespace having files related to a flexible volume in which users cannot "see" the files. The hidden meta-data root directory includes the WAFL/fsid/directory structure that contains filesystem file 740 and storage label file 790. Note that root directory 720 in the aggregate is empty; all files related to the aggregate are organized within the hidden meta-data root directory 730.

In addition to being embodied as a container file having level 1 blocks organized as a container map, the filesystem file 740 includes block pointers that reference various file systems embodied as flexible volumes 750. The aggregate 700 maintains these flexible volumes 750 at special reserved inode numbers. Each flexible volume 750 also has special reserved inode numbers within its flexible volume space that are used for, among other things, the block allocation bitmap structures. As noted, the block allocation bitmap structures, e.g., active map 762, summary map 764 and space map 766, are located in each flexible volume.

Specifically, each flexible volume 750 has the same inode file structure/content as the aggregate, with the exception that there is no owner map and no WAFL/fsid/filesystem file, storage label file directory structure in a hidden meta-data root directory 780. To that end, each flexible volume 750 has a volinfo block 752 that points to one or more fsinfo blocks 754, each of which may represent a snapshot, along with the active file system of the flexible volume. Each fsinfo block, in turn, points to an inode file 760 that, as noted, has the same inode structure/content as the aggregate with the exceptions noted above. Each flexible volume 750 has its own inode file 760 and distinct inode space with corresponding inode numbers, as well as its own root (fsid) directory 770 and subdirectories of files that can be exported separately from other flexible volumes.

The storage label file 790 contained within the hidden meta-data root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated flexible volume 750, the online/offline status 794 of the flexible volume, and other identity (e.g., DSID) and state information 796 of the associated flexible volume (whether it is in the process of being created or destroyed).

VLDB

Figure 8:
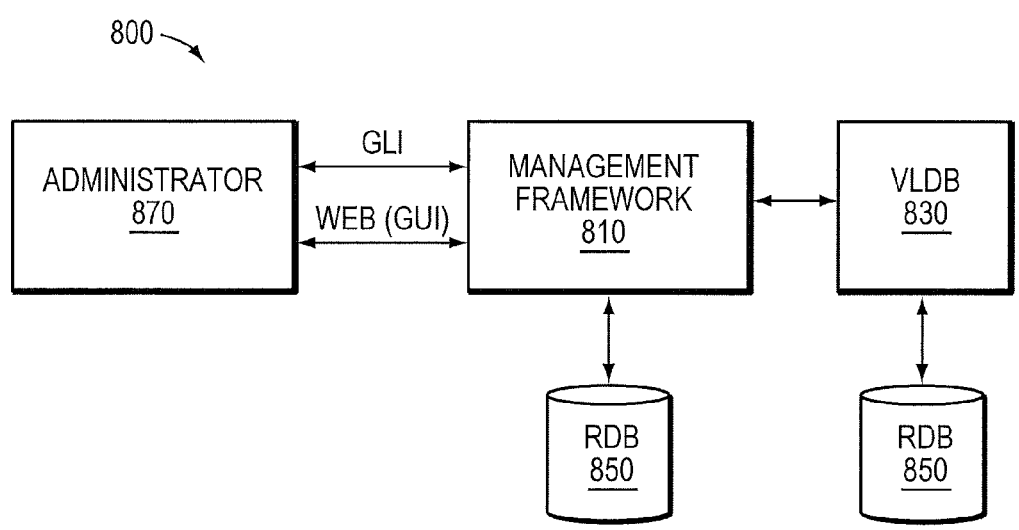
FIG. 8 is a schematic block diagram illustrating a collection of management processes in accordance with an embodiment of the present invention.

FIG. 8 is a schematic block diagram illustrating a collection of management processes that execute as user mode applications 800 on the storage operating system 300 to provide management of configuration information (i.e. management data) for the nodes of the cluster. To that end, the management processes include a management framework process 810 and a volume location database (VLDB) process 830, each utilizing a data replication service (RDB 850) linked as a library. The management framework 810 provides an administrator 870 an interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 830 is a database process that tracks the locations of various storage components, including data containers such as flexible volumes, (hereafter "volumes") within the DR group to thereby facilitate routing of requests throughout the cluster.

Figure 9:
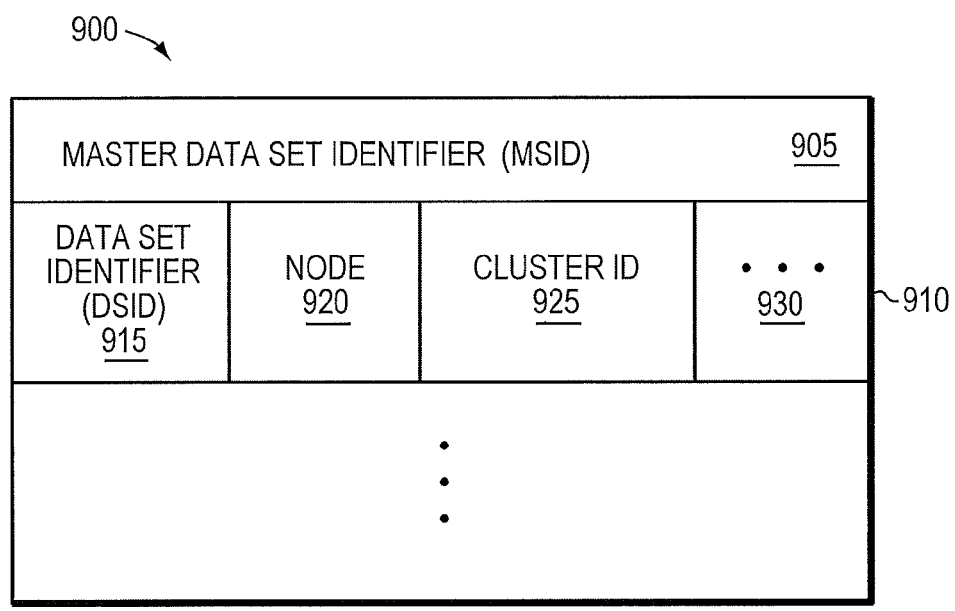
FIG. 9 is a block diagram of a data structure linking master data set identifiers to data set identifier.

Further to the illustrative embodiment, the VLDB contains one or more data set data structures 900 that associate a single MSID with one or more DSIDs representative of various instantiations of the data within the cluster. FIG. 9 is a schematic block diagram of an exemplary data set identifier data structure 900 in accordance with an embodiment of the present invention. Each the data set data structure 900 includes a MSID field 905 and one or more entries 910. Illustratively, a plurality of DSIDs may be mapped to a single MSID. Each entry 910 comprises a DSID field 915, a node field 920, a cluster identifier field 925 and, in alternate embodiments, additional fields 930. The MSID field 905 contains a MSID value associated with the data set data structure 900, i.e., each entry 910 is associated with one DSID that is related to the MSID identified in the MSID field 905. The DSID field 915 contains a data set identifier value for the particular instantiation of the data associated with the MSID 905. The node field 920 identifies a node within the storage system cluster that is currently servicing the DSID. Similarly, the cluster ID field 925 identifies the cluster within which the node identified in field 920 exists. In the illustrative embodiment, the cluster ID field 925 may identify the local cluster or, in alternate embodiments, may identify a remote cluster. For example, a data container may be mirrored to another cluster. In such an embodiment, the mirror destination entry 910 would identify the cluster ID associated with the cluster servicing the mirror destination data container.

Figure 10:
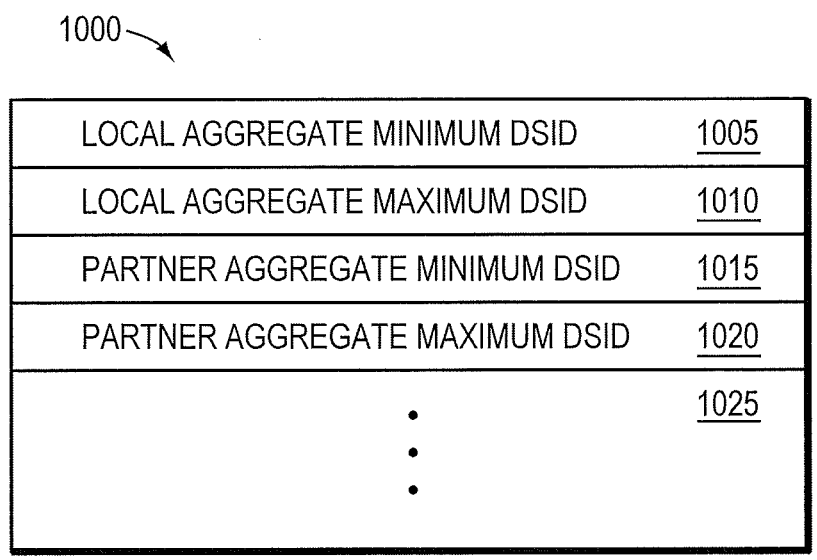
FIG. 10 is a block diagram of a data structure showing data set identifier ranges.

FIG. 10 is a schematic block diagram of an exemplary range table data container 1000 in accordance with an embodiment of the present invention. The range table data container 1000 includes a local aggregate minimum DSID field 1005, a local aggregate maximum DSID field 1010, a partner aggregate minimum DSID field 1015, a partner aggregate maximum DSID field 1020 and, in alternative embodiments, additional fields 1025. Illustratively, the range table data structure 1000 is utilized by a VLDB to store the particular ranges of DSIDs (or other object identifiers) that are associated with the local aggregates or which are associated with partner aggregates. This enables the VLDB to determine whether a data container, such as a volume DSID is within a range associate with either local aggregates with partner aggregates. The local aggregate minimum DSID and maximum DSID fields 1005, 1010 identify a minimum and maximum DSID value for volumes in aggregates that are originally owned by nodes in a local cluster. Similarly, the partner aggregate minimum and maximum DSID fields 1015 and 1020 identify a minimum and maximum values of DSIDs that may be utilized for volumes in aggregates that are originally owned by nodes in the peered cluster. It is possible that upon the creation of a clustering arrangement, pre-existing volumes may have a DSID value that is out of the range of the DSID values associated with a particular site, either local or remote. The VLDB utilizes the mapping table 1000 to store old DSID to new DSID mapping.

FIG. 11 is a schematic diagram of an exemplary tracking data structure 1100. Tracking data structure 1100 illustratively includes a last allocated DSID field 1105, a last allocated MSID field 1110, a last allocated reference ID field 1115, a last allocated DSID for partner field 1120 and, in alternative embodiments, additional fields 1125. The tracking data structure 1100 is utilized by the VLDB to track the last used value for each of the identifiers. Illustratively, each identifier is monotonically increased when a new volume is a created. As such, the tracking data structure 1100 maintains the current value for these identifiers. For example, when a new volume is created, its DSID is set to the value of the last allocated DSID field 1105 plus one. It should be noted that the description herein of values being monotonically increased should be taken as exemplary only.

Figure 12:
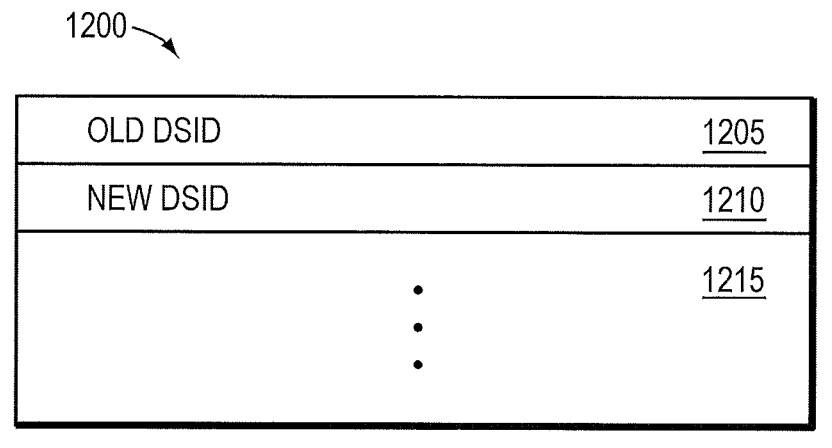

FIG. 12. is a block diagram of a mapping data structure 1200. Illustratively, the VLDB utilizes mapping data structures 1200 to map old DSIDs to new DSIDs. Such mappings may be required when a pre-existing volume is assigned a DSID that is outside of the range of DSIDs that is selected for a site when a new DR group is established. The mapping data structure includes an old DSID field 1205, a new DSID field 1210 and, in alternative embodiments, additional fields 1215. In operation, the VLDB will store the out of range DSID in the old DSID field 1205 and the new DSID in the new DSID field 1210.

Figure 13:
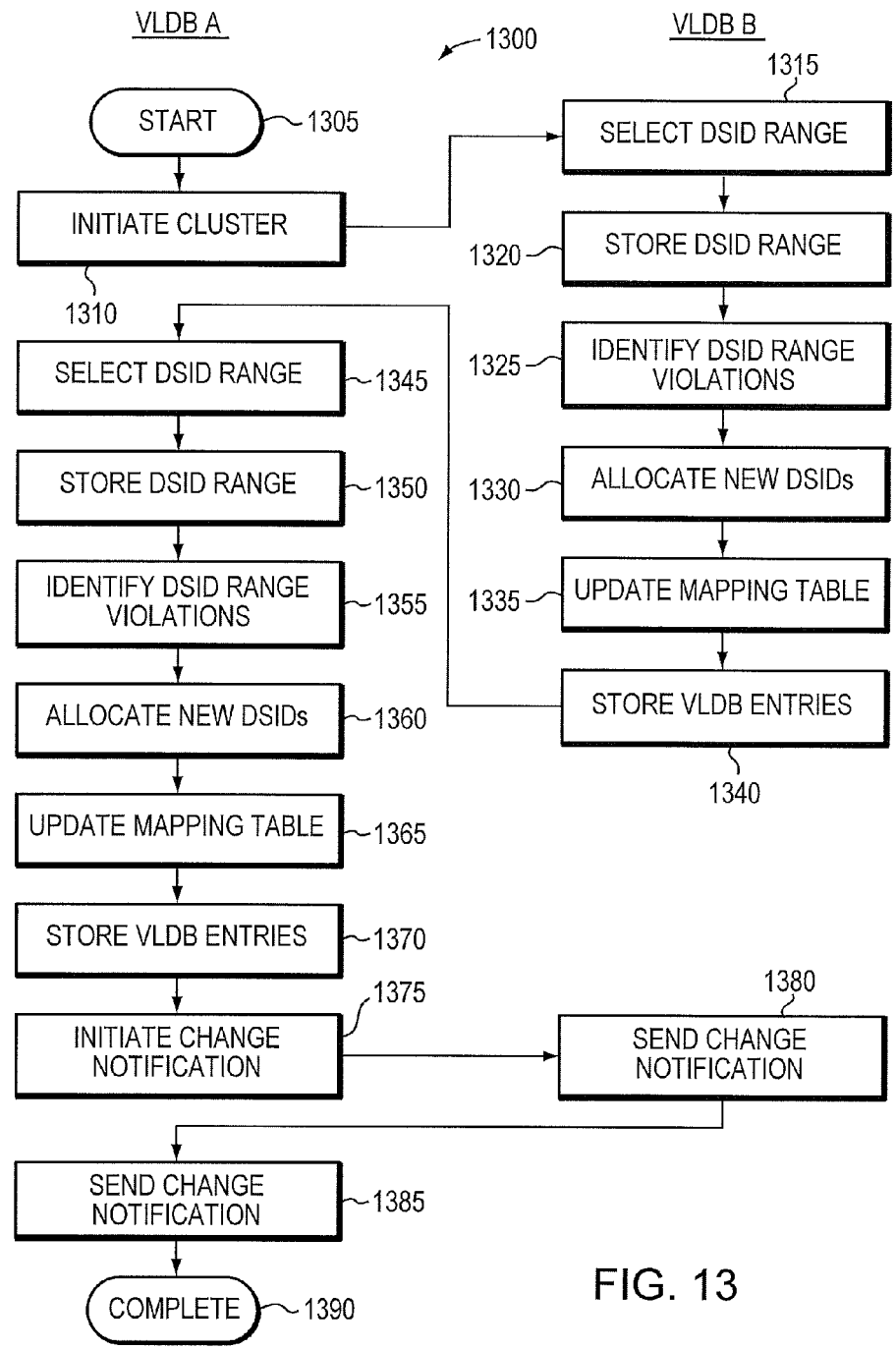
FIG. 13 is a flowchart detailing steps of a procedure for avoiding object identifier collisions in a cluster environment.

FIG. 13 is a flowchart detailing the steps of a procedure 1300 for avoiding conflicts of object identifiers. The procedure 1300 begins in step 1305 and continues to step 1310 where a command is executed to initialize a disaster recovery group. This may occur due to, for example, an administrator executing an appropriate command, either via a management graphical user interface (GUI) or a command line interface (CLI) to form a clustering arrangement. It should be noted that while the description in relation to procedure 1300 is written in terms of the cluster being originated on site A, i.e. in accordance with alternative embodiments of the present invention, the principles of the present invention may be utilized for instantiations where the clustering arrangement is originated from site B. As such, the description contained herein should be taken as exemplary only. In response to the cluster being initiated, the VLDB A transmits a command to the VLDB B indicating that the new clustering arrangement is to be created. In response, the VLDB B then, in step 1315 selects a DSID range. Illustratively, the range of possible DSID is an unsigned 64-bit number which provides the possibility for 4 billion possible DSIDs. The VLDB selects a range, for example, either the bottom half or the upper, based on a variety of factors. One factor may be the existence of pre-existing volumes associated with VLDB. Should a significant number of a pre-existing volumes have DSIDs within a certain range, the VLDB may select that range to reduce the number of remapping operations that need to be performed.

Once the DSID range has been selected in step 1315, the procedure continues to step 1321 where the VLDB B stores the DSID ranges. Illustratively, the DSID ranges may be stored in an exemplary data container 1000. The VLDB B then identifies whether any DSID range violations have occurred in step 1325. A DSID range violation may occur when, for example, a pre-existing volume associated with the VLDB is utilizing DSID value that is outside of the range selected by the VLDB in step 1315. If there are any range violations, VLDB B then allocated news DSIDs for the volumes that had conflicting DSIDS in step 1330. The new DSIDs are then stored in one or more mapping tables in step 1335. The mapping tables 1200 are illustratively stored in the VLDB in step 1340.

In step 1345 the VLDB A selects a range of DSIDs. Illustratively, the range of DSIDs selected by the VLBD A comprises those DSIDs not selected by VLDB B. The selected range of DSIDs are then stored in VLDB A in step 1350. The VLDB A then identifies whether any pre-existing volumes associated with the VLDB have a DSID that is outside of the selected range in step 1355. Should any volumes be identified as being out of range, the VLDB then, in step 1360, allocates new DSIDs that are within the selected range. A mapping between the old DSID and new DSID is stored in a mapping data structure 1200 in step 1365. The mapping table data structure 1200 and range data structure 1000 are then stored in the VLDB in step 1370.

Once the VLDB entries have been stored, VLDB A then transmits a change notification message to VLDB B in step 1375. In response, VLDB B sends a change notification in step 1380. VLDB A then sends its own change notification in step 1385. The change notifications alert clients of the VLDBs that DSIDs may have been changed and that clients should utilize the new DSIDs when communicating with the storage systems. The procedure 1300 then completes in step 1390.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   selecting a first range of object identifiers to use by a first storage cluster for identifying volumes hosted by the first storage cluster;
   storing the first range of object identifiers within a first volume location database;
   evaluating object identifiers, currently assigned by the first storage cluster to volumes hosted by the first storage cluster, with the first range of object identifiers;
   generating a new object identifier for a current volume hosted by the first storage cluster based upon a current object identifier of the current volume being outside the first range of object identifiers;
   creating a mapping data structure to map the current object identifier to the new object identifier;
   storing the mapping data structure within the first volume location database for referencing the current volume using the new object identifier;
   sending a message to a second storage cluster of the first range of object identifiers; and
   instructing the second storage cluster to select a second range of object identifiers that does not overlap the first range of object identifiers.

2. The method of claim 1, comprising:
   instructing the second storage cluster to evaluate object identifiers, currently assigned by the second storage cluster to volumes hosted by the second storage cluster, with the second range of object identifiers; and instructing the second storage cluster to generate a second new object identifier for a second current volume hosted by the second storage cluster based upon a second current object identifier of the second current volume being outside the second range of object identifiers.

3. The method of claim 2, comprising:
instructing the second storage cluster to create a second mapping data structure to map the second current object identifier to the second new object identifier; and
instructing the second storage cluster to store the second mapping data structure within a second volume location database for referencing the second current volume using the second new object identifier.

4. The method of claim 1, comprising:
utilizing the mapping data structure within the first volume location database to route a request, directed to the new object identifier, to the current volume having the current object identifier.

5. The method of claim 1, comprising:
specifying a data set identifier as an object identifier.

6. The method of claim 1, wherein the storing the first range of object identifiers comprises:
storing the first range of object identifiers as a first set of entries within the first volume location database; and
populating the first set of entries with a local minimum object identifier value.

7. The method of claim 6, comprising:
populating the first set of entries with a partner minimum object identifier value.

8. The method of claim 7, comprising:
populating the first set of entries with a local maximum object identifier value.

9. The method of claim 8, comprising:
populating the first set of entries with a partner maximum object identifier value.

10. A non-transitory computer-readable medium comprising instructions for performing a method, which when executed by a machine, causes the machine to:
store a first range of object identifiers within a first volume location database;
evaluate object identifiers, currently assigned by a first storage cluster to volumes hosted by the first storage cluster, with the first range of object identifiers;
generate a new object identifier for a current volume hosted by the first storage cluster based upon a current object identifier of the current volume being outside the first range of object identifiers;
create a mapping data structure to map the current object identifier to the new object identifier;
store the mapping data structure within the first volume location database for referencing the current volume using the new object identifier;
send a message to a second storage cluster of the first range of object identifiers; and
instruct the second storage cluster to select a second range of object identifiers that does not overlap the first range of object identifiers.

11. The non-transitory computer-readable medium of claim 10, wherein the instructions cause the machine to:
instruct the second storage cluster to evaluate object identifiers, currently assigned by the second storage cluster to volumes hosted by the second storage cluster, with the second range of object identifiers; and
instruct the second storage cluster to generate a second new object identifier for a second current volume hosted by the second storage cluster based upon a second current object identifier of the second current volume being outside the second range of object identifiers.

12. The non-transitory computer-readable medium of claim 10, wherein the instructions cause the machine to:
instruct the second storage cluster to create a second mapping data structure to map a second current object identifier to a second new object identifier; and
instruct the second storage cluster to store the second mapping data structure within a second volume location database for referencing a second current volume using the second new object identifier.

13. The non-transitory computer-readable medium of claim 10, wherein the instructions cause the machine to:
utilize the mapping data structure within the first volume location database to route a request, directed to the new object identifier, to the current volume having the current object identifier.

14. The non-transitory computer-readable medium of claim 10, wherein the instructions cause the machine to:
store the first range of object identifiers as a first set of entries within the first volume location database; and
populate the first set of entries with a local minimum object identifier value used by the first storage cluster, a partner minimum object identifier value used by the second storage cluster, a local maximum object identifier value used by the first storage cluster, and a partner maximum object identifier value used by the second storage cluster.

15. A computing device comprising:
a memory containing machine readable medium comprising machine executable code having stored thereon instructions for performing a method; and
a processor coupled to the memory, the processor configured to execute the machine executable code to cause the processor to:
select a first range of object identifiers to use by a first storage cluster for identifying volumes hosted by the first storage cluster;
store the first range of object identifiers within a first volume location database;
evaluate object identifiers currently assigned by the first storage cluster to volumes currently hosted by the first storage cluster;
generate a new object identifier for a current volume hosted by the first storage cluster based upon a current object identifier of the current volume being outside the first range of object identifiers;
create a mapping data structure to map the current object identifier to the new object identifier;
store the mapping data structure within the first volume location database for referencing the current volume using the new object identifier;
send a message to a second storage cluster of the first range of object identifiers; and
instruct the second storage cluster to select a second range of object identifiers that does not overlap the first range of object identifiers.

16. The computing device of claim 15, wherein the machine executable code causes the processor to:
instruct the second storage cluster to evaluate object identifiers, currently assigned by the second storage cluster to volumes hosted by the second storage cluster, with the second range of object identifiers; and
instruct the second storage cluster to generate a second new object identifier for a second current volume hosted by the second storage cluster based upon a second current object identifier of the second current volume being outside the second range of object identifiers.

17. The computing device of claim 15, wherein the machine executable code causes the processor to:
instruct the second storage cluster to create a second mapping data structure to map a second current object identifier to a second new object identifier; and
instruct the second storage cluster to store the second mapping data structure within a second volume location database for referencing a second current volume using the second new object identifier.

18. The computing device of claim 15, wherein the machine executable code causes the processor to:
utilize the mapping data structure within the first volume location database to route a request, directed to the new object identifier, to the current volume having the current object identifier.

19. The computing device of claim 15, wherein the machine executable code causes the processor to:
store the first range of object identifiers as a first set of entries within the first volume location database; and
populate the first set of entries with a local minimum object identifier value used by the first storage cluster, a partner minimum object identifier value used by the second storage cluster, a local maximum object identifier value used by the first storage cluster, and a partner maximum object identifier value used by the second storage cluster.

20. The computing device of claim 15, wherein the machine executable code causes the processor to:
specify a data set identifier as an object identifier.

* * * * *